(12) United States Patent
Naguib et al.

(10) Patent No.: US 7,010,029 B1
(45) Date of Patent: Mar. 7, 2006

(54) EQUALIZATION OF TRANSMIT DIVERSITY SPACE-TIME CODED SIGNALS

(75) Inventors: Ayman F Naguib, Lincroft, NJ (US); Arthur R Calderbank, Princeton, NJ (US)

(73) Assignee: AT&T Corp., New York, NY (US)

( * ) Notice: Subject to any disclaimer, the term of this patent is extended or adjusted under 35 U.S.C. 154(b) by 813 days.

(21) Appl. No.: 09/687,238

(22) Filed: Oct. 13, 2000

Related U.S. Application Data

(60) Provisional application No. 60/196,599, filed on Apr. 13, 2000.

(51) Int. Cl.
  *H03H 7/30* (2006.01)
  *H03H 7/40* (2006.01)
  *H03K 5/159* (2006.01)

(52) U.S. Cl. .................. 375/229; 375/347; 375/350; 375/265; 714/795; 714/796

(58) Field of Classification Search ........ 375/229–234, 375/259, 260, 265, 267, 347, 349, 350; 714/795, 714/796
See application file for complete search history.

(56) References Cited

U.S. PATENT DOCUMENTS

| | | | | | |
|---|---|---|---|---|---|
| 4,670,885 | A | * | 6/1987 | Parl et al. ................... 375/148 |
| 5,295,159 | A | * | 3/1994 | Kerpez ........................ 375/260 |
| 5,467,374 | A | | 11/1995 | Chennakeshu et al. |
| 5,475,716 | A | * | 12/1995 | Huang ........................ 375/354 |
| 5,499,272 | A | * | 3/1996 | Bottomley ................... 375/347 |
| 5,511,096 | A | * | 4/1996 | Huang et al. ............... 375/265 |
| 5,566,209 | A | * | 10/1996 | Forssen et al. .............. 375/262 |
| 5,689,528 | A | * | 11/1997 | Tsujimoto ................... 375/233 |
| 5,786,725 | A | * | 7/1998 | Boccuzzi et al. ........... 329/304 |
| 5,889,825 | A | * | 3/1999 | Schreib ....................... 375/347 |
| 5,914,989 | A | * | 6/1999 | Thapar et al. ............... 375/341 |
| 5,923,651 | A | * | 7/1999 | Struhsaker .................. 370/342 |
| 6,115,419 | A | * | 9/2000 | Meehan ....................... 375/233 |
| 6,173,014 | B1 | * | 1/2001 | Forssen et al. .............. 375/267 |
| 6,298,092 | B1 | * | 10/2001 | Heath et al. ................. 375/267 |
| 6,314,147 | B1 | * | 11/2001 | Liang et al. ................. 375/346 |
| 6,377,636 | B1 | * | 4/2002 | Paulraj et al. ............... 375/346 |
| 6,556,632 | B1 | * | 4/2003 | Kubo et al. .................. 375/341 |
| 6,661,856 | B1 | * | 12/2003 | Calderbank et al. ........ 375/347 |
| 6,665,348 | B1 | * | 12/2003 | Feher .......................... 375/259 |
| 6,690,754 | B1 | * | 2/2004 | Haratsch et al. ............ 375/346 |
| 6,700,882 | B1 | * | 3/2004 | Lindoff et al. .............. 370/337 |
| 6,718,511 | B1 | * | 4/2004 | Kravtchenko et al. ...... 714/796 |
| 6,744,814 | B1 | * | 6/2004 | Blanksby et al. ........... 375/232 |
| 6,775,329 | B1 | * | 8/2004 | Alamouti et al. ........... 375/267 |
| 2004/0037374 | A1 | * | 2/2004 | Gonikberg .................. 375/341 |

* cited by examiner

*Primary Examiner*—Jean B Corrielus
(74) *Attorney, Agent, or Firm*—Henry T. Brendzel

(57) ABSTRACT

A method executed in a receiver that combines a decoder with an equalizer in a single module, comprising receiving at time k a signal r(k) in the receiver. Selecting as a signal transmitted by a transmitter a signal that minimizes the following equation metric $$\xi_j(k) = \left| r(k) - \sum_{l=L_1+1}^{L_1} \bar{h}_j(l)\tilde{s}(k-l) - \sum_{l=L_1+1}^{L+1} \bar{h}_j(l)\hat{s}(k-l) \right|^2$$

where $\bar{h}_j(l)$ is related to both the transmission channel and to the encoding structure in the transmitter, $\tilde{s}(k)$ is a trial symbol specified by a selected trellis transition and $\hat{s}(k)$ is a symbol that was previously decided. Applying the selected signal to the decoder to decode received symbols.

2 Claims, 2 Drawing Sheets

EQUALIZATION OF TRANSMIT DIVERSITY SPACE-TIME CODED SIGNALS

RELATED APPLICATION

This invention claims priority from Provisional application No. 60/196,599, filed Apr. 13, 2000.

BACKGROUND

This invention relates to multi-antenna receivers.

Future wireless communications systems promise to offer a variety of multimedia services. To fulfill this promise, high data rates need to be reliably transmitted over wireless channels. The main impairments of wireless communication channels are time varying fading due to multipath propagation, and time dispersion. The multipath fading problem can be solved through antenna diversity, which reduces the effects of multipath fading by combining signals from spatially separated antennas. The time dispersion problem can be solved by equalization, such as linear, decision feedback, and maximum likelihood sequence estimation (MLSE).

It has been a standard practice to use multiple antennas at the receiver with some sort of combining of the received signals, e.g., maximal ratio combining. However, it is hard to efficiently use receive antenna diversity at remote units, e.g., cellular phones, since they typically need to be relatively simple, small, and inexpensive. Therefore, receive antenna diversity and array signal processing with multiple antennas have been almost exclusively used (or proposed) for use at the base station, resulting in an asymmetric improvement of the reception quality only in the uplink.

Recently, there have been a number of proposals that use multiple antennas at the transmitter with the appropriate signal processing to jointly combat the above wireless channel impairments and provide antenna diversity for the downlink while placing most of the diversity burden on the base station. Substantial benefits can be achieved by using channel codes that are specifically designed to take into account multiple transmit antennas. The first bandwidth efficient transmit diversity scheme was proposed by Wittneben and it included the transmit diversity scheme of delay diversity as a special case. See N. Seshadri and J. H. Winters, "Two Schemes for Improving the Performance of Frequency-Division Duplex (FDD) Transmission Systems Using Transmitter Antenna Diversity," *International Journal of Wireless Information Networks*, vol. 1, pp. 49–60, January 1994. In V. Tarokh, N. Seshadri, and A. R. Calderbank, "Space-Time Codes for High Data Rate Wireless Communications: Performance Criterion and Code Construction," *IEEE Trans. Inform. Theory*, pp. 744–765, March 1998, space-time trellis codes are introduced, and a general theory for design of combined trellis coding and modulation for transmit diversity is proposed. An input symbol to the space-time encoder is mapped into N modulation symbols, and the N symbols are transmitted simultaneously from N transmit antennas, respectively. These codes were shown to achieve the maximal possible diversity benefit for a given number of transmit antennas, modulation constellation size, and transmission rate. Another approach for space-time coding, space-time block codes, was introduced by S. Alamouti, in "Space Block Coding: A Simple Transmitter Diversity Technique for Wireless Communications," *IEEE Journal on Selec. Areas. Commun.*, vol. 16 pp. 1451–1458, October 1998 and later generalized by V. Tarokh, H. Jafarkhani, and A. R. Calderbank, in "Space Time block Codes From Orthogonal Designs," *IEEE Trans. Inform. Theory*, vol. 45, pp. 1456–1467, July 1999.

Space-time codes have been recently adopted in third generation cellular standard (e.g. CDMA-2000 and W-CDMA). The performance analysis of the space-time codes in the above-mentioned articles was done assuming a flat fading channel. Analysis shows that the design criteria of space-time trellis codes is still optimum when used over a frequency selective channel, assuming that the receiver performs the optimum matched filtering for that channel. In addition, although the space-time coding modem described in A. F. Naguib, V. Tarokh, N. Seshadri and A. R. Calderbank, "A Space-Time Coding Based Modem for High Data Rate Wireless Communications," *IEEE Journal on Selec. Areas Commun.*, vol. 16, pp. 1459–1478, October 1998 was designed assuming a flat fading channel, it performed remarkably well when used over channels with delay spreads that are relatively small as compared to the symbol period $T_s$. However, when the delay spread is large relative to the symbol period, e.g., $>T_s/4$, there was a severe performance degradation.

SUMMARY

In connection with transmitted space-time, trellis encoded, signals that pass through a transmission channel that is characterized by memory, improved performance is realized with a receiver that combines a decoder with an equalizer that selects the trellis transition, s, that minimizes the metric $$\xi_j(k) = \left| r(k) - \sum_{l=L_1+1}^{L_1} \tilde{h}_j(l)\tilde{s}(k-l) - \sum_{l=L_1+1}^{L+1} \tilde{h}_j(l)\hat{s}(k-l) \right|^2$$

where $\tilde{h}_j(l)$ is related to both the transmission channel and to the encoding structure in the transmitter, $\tilde{s}(k)$ are the (trial) symbols according to a certain transition and $\hat{s}(k)$ are the symbols that were previously decided.

DETAILED DESCRIPTION

Figure 1:
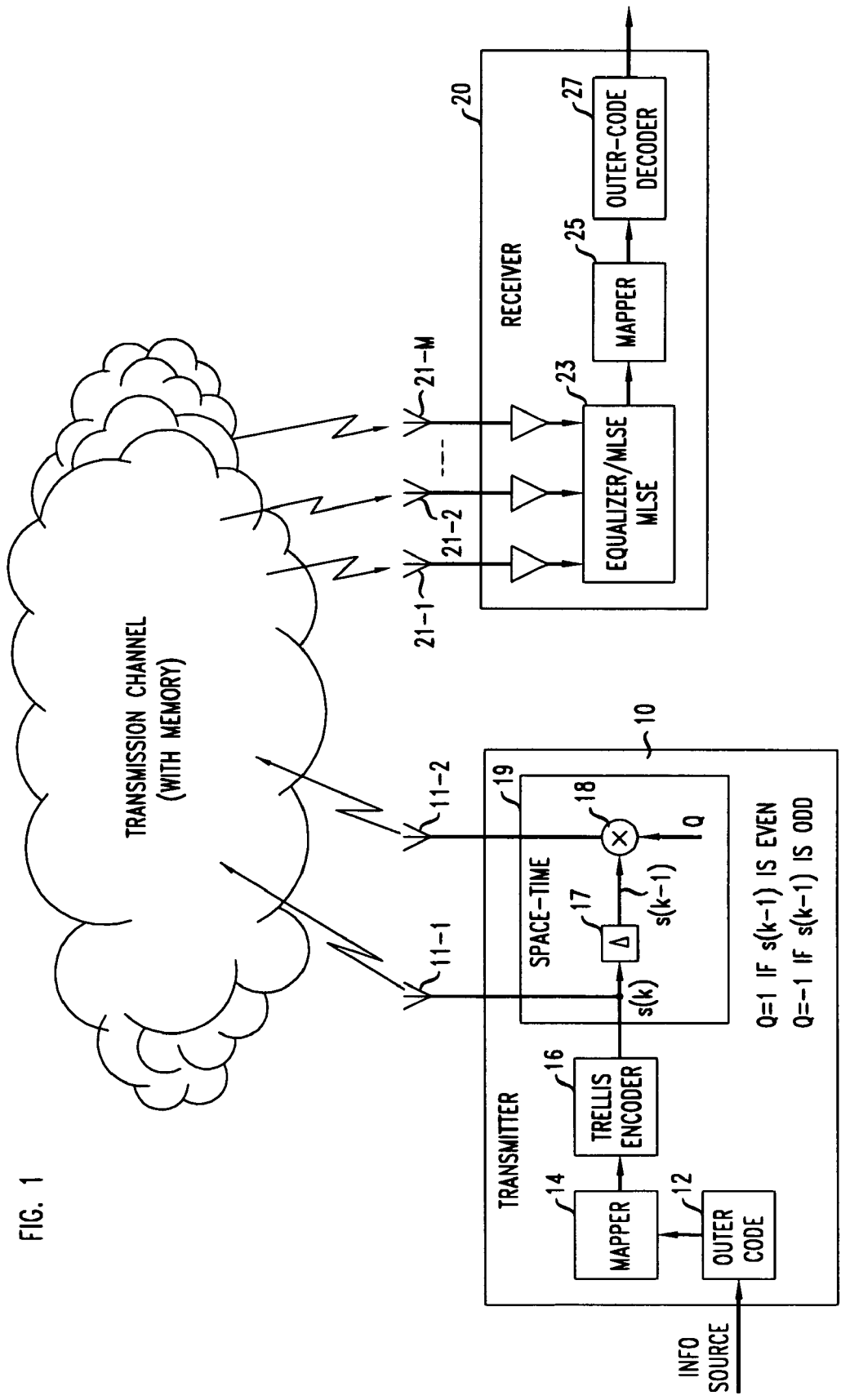
FIG. 1 depicts a transmitter having a plurality of antennas, and a receiving having a plurality of antennas, where the transmission channel between them includes memory.

FIG. 1 presents the general scenario of a transmitter 10 having N transmit antennas, for example 11-1, and 11-2, and a receiver 20 with 21-1, 21-2, . . . 21-M receive antennas, in a frequency selective Rayleigh fading environment. The M receive antennas are coupled to equalizer/decoder 23, equalizer/decoder 23 is coupled to symbol-to-bits mapper 25, and mapper 25 is connected to an outer-code decoder 27 (if the signal transmitted by transmitter 10 is encoded with an outer-code encoder 12—as shown in transmitter 10). The design and operation of equalizer/decoder, which may be implemented with a conventional digital signal processor, is the subject of this disclosure.

Generally, the impulse response of the transmission channel between the i-th transmitting to the j-th receiving antennas, when modeled with a time varying FIR impulse response, is $$g_{ij}(k) = \sum_{l=0}^{L} h_{ij}(k,l)\delta(k-l), \quad (1)$$

which includes the effects of the transmitter and receiver pulse shaping filters and the physical multipath channel. Equation (1) incorporates the notion that for various reasons, such as a plurality of different-distance paths, the transmission channel includes memory. Without loss of generality, it is assumed that the channel model order (i.e., the channel's memory) is L+1. It is also assumed that the channel parameters $\{h_{ij}(k,l), i=1 \ldots M\}$ are invariant within a data burst, although they may be varying from burst to burst. In cellular systems such as GSM, the length of a data burst is about of 0.58 ms, and compared to the coherence time of the channel at 60 MPH mobile velocity, which is approximately 12.5 ms, the burst length is small enough such that the block time-invariant channel model is valid. This assumption is satisfied in most of the GSM environment.

The $h_{ij}(k,l)$ elements are modeled as iid complex Gaussian random variables with zero mean and variance $\sigma_h^2(l)$, and the channel is assumed to be passive; that is $$\sum_{l=0}^{L} \sigma_h^2(l) = 1. \quad (2)$$

When s(k) is the signal that is applied to time-space encoder 19 of FIG. 1, the corresponding output is $\{c_1(k), c_2(k), \ldots, c_N(k)\}$, where $c_i(k)$ is the code symbol transmitted from antenna i at time k. The received signal at receive antenna j can be expressed by:

$$r_j(k) = \sum_{i=1}^{N} \sum_{l=0}^{L} h_{ij}(l) c_i(k-l) + n_j(k), \quad 1 \leq j \leq M, \quad (3)$$

where $n_j(k)$ is a sequence of iid complex Gaussian noise samples with zero mean and variance $\sigma_n^2$. One of the summations in equation (3) can be put in a matrix form, to yield $$r_j(k) = \sum_{i=1}^{N} g_{ij} \cdot c_i(k) + n_j(k), \quad (4)$$

where $g_{ij} = [h_{ij}(0) h_{ij}(1) \ldots h_{ij}(L)]$ and $c_i(k) = [c_i(k) c_i(k-1) \ldots c_i(k-L)]^T$. The output of the M receive antennas at time k can thus be expressed by $$r(k) = [r_1(k) r_2(k) \ldots r_M(k)]^T \quad (5)$$
$$= \sum_{i=1}^{N} H_i \cdot c_i(k) + n(k)$$

-continued where $$n(k) = [n_1(k) n_2(k) \ldots n_M(k)]^T$$

$$H_i = \begin{bmatrix} g_{i1} \\ g_{i2} \\ \vdots \\ g_{iM} \end{bmatrix} = [h_i(0) h_i(1) \ldots h_i(L)], \text{ and}$$

$$h_i(l) = [h_{i1}(l) h_{i2}(l) \ldots h_{iM}(l)]^T.$$

The noise vector n(k) has a zero mean and covariance $R_n = \sigma_n^2 \cdot I_{M \times M}$.

Extending equation (5) to a D+1 sequence of received signals (e.g., a D-stage shift register, yielding D+1 taps), a vector x(k) can be considered that can be expressed by $$x(k) = [r(k)^T r(k-1)^T \ldots r(k-D)^T]^T.$$

The new space-time data model is then given by $$x(k) = \sum_{i=1}^{N} \mathcal{H}_i \cdot \overline{c}_i(k) + \overline{n}(k) \quad (6)$$

where $\overline{c}_i(k) = [c_i(k), c_i(k-1), \ldots c_i(k-L-D)]^T$, $\overline{n}(k) = [n(k)^T, n(k-1)^T \ldots n(k-L)^T]^T$, and $$\mathcal{H}_i = \begin{bmatrix} \boxed{H_i} & \ldots & 0 \\ & \ddots & \\ 0 & \ldots & \boxed{H_i} \end{bmatrix} \quad (7)$$

is an M(D+1)×(L+D+1) matrix. The noise vector $\overline{n}(k)$ has a zero mean and covariance $R_{\overline{n}} = \sigma_n^2 \cdot I_{M(D+1)} \times M(D+1)$.

Figure 3:
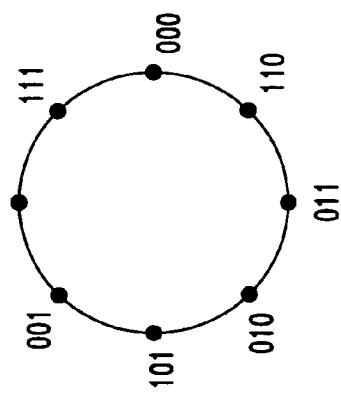
FIG. 3 is an advantageous constellation mapping.

With the above analysis in mind, one might consider the situation where the mapper 14 is an 8-PSK 8-state mapper, followed by a trellis encoder 16 whose output is applied to space-time coder 19. The input to coder 19 forms a first output of the space-time coder, and is applied to antenna 11-1. This input is also applied to delay element 17 and thence to multiplier 18, which creates a second output of the space-time coder. That second output is applied to antenna 11-2. Multiplier 18 multiplies the mapped signal by −1 (rotates it by 180) when the symbol applied to multiplier 18 is odd. Advantageously, the mapping within element 14 is as depicted in FIG. 3; that is, traversing the unit circle counterclockwise starting with 0, the sequence of mappings is $\{0,7,6,1,5,2,3,4\}$.

Figure 2:
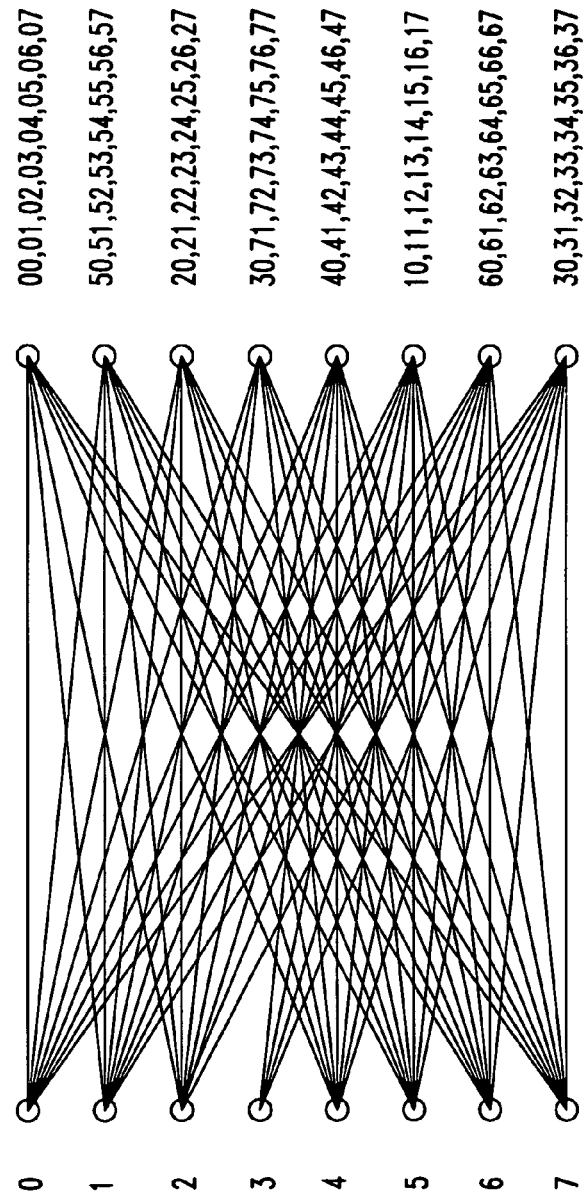
FIG. 2 illustrates a particular trellis structure for the trellis encoder shown in the FIG. 1 transmitter.

The trellis of encoder 16 is shown in FIG. 2. For this arrangement, the input bit stream is grouped into group of three bits each and each group is mapped into one of the 8 constellation points, which are also states of the trellis encoder. The column to the left of the trellis is the state label and each row to the right of the trellis represents the edge labels for transitions from the corresponding state. An edge label $c_1 c_2$ indicates that symbol $c_1$, is transmitted from the first antenna and symbol $c_2$ is transmitted from second antenna. To illustrate, assuming that the encoder starts from state '0'—which is the conventional assumption—if the input sequence is $\{0\ 1\ 5\ 7\ 6\ 4\}$ then operating pursuant to the FIG. 2 trellis yields the sequence {0 1 5 7 6 4} that is transmitted over the first antenna and the sequence {0 0 5 1 3 6} that is transmitted over the second antenna.

For data rates on the order of the coherence bandwidth of the channel, or larger, an equalizer needs to be used to compensate for the intersymbol interference induced by the resolvable multipath receptions. There are two basic, yet powerful, equalization techniques that are used for equalization over wireless channels: the probabilistic symbol-by-symbol MAP algorithm, which provides the MAP-probabilities for each individual symbol, and the Viterbi algorithm (VA), which is a maximum likelihood sequence estimator (MLSE) that outputs the ML-channel path. Both techniques have the advantage that they gather energy from all channel tap gains (therefore taking full advantage of the diversity gain offered by the multipath propagation) without suffering from noise enhancement or error propagation. This is rather an important feature because in wireless propagation environments the reflections may be stronger than the direct path. The main problem of both approaches, however, is their complexity in terms of the equalizer states. For example, in case of space-time coding with N transmit antennas and a channel response with length L+1, the number of equalizer states will be $(\mathfrak{M}^N)^L$, where $\mathfrak{M}$ is the number of constellation points. That is, the equalizer complexity is exponential in terms of number of transmit antennas and channel memory.

The equalizer complexity problem can be solved by using a reduced complexity approach by M. V. Eyuboglu and S. U. Qureshi, in "Reduced-State Sequence Estimation with Set Partioning and Decision Feedback," *IEEE Trans. Commun.*, vol. COM-36, pp. 12–20, January 1988. However, reduced complexity techniques suffer from performance degradation if the channel response is not minimum phase, or nearly so. Since wireless channels are time varying and hence the minimum phase condition is not guaranteed all the time, a whitened matched filter or a pre-curser equalizer must be used to render the channel minimum phase all the time. Although designing a whitened matched filter is well known for the classical equalization problem, it is not known for space-time coding with transmit diversity. This is because, as mentioned earlier, the received signal at the receiver is the superposition of all transmitted signals that propagated through totally independent channels. Consequently, the job of the whitened matched filter in this case is to render all of these channels minimum phase at the same time; and it is not known how to achieve this.

To overcome this problem, the following discloses a reduced complexity approach that uses the structure that is present in some space-time trellis codes, such as the one presented in FIG. 2.

Defining $s(k) \equiv [s(k)\ s(k-1)\ \ldots\ s(k-L)]^T$, from FIG. 2 it can be seen that the code symbols to be transmitted from the first antenna (at time $k, k-1, \ldots\ k-L$) are $c_1(k)=[s(k)\ s(k-1)\ \ldots\ s(k-L)]^T$ and, hence, $c_1, (k)=s(k)$. The corresponding code symbols to be transmitted from the second antenna can be expressed by $$c_2(k) = S \cdot s(k-1)$$

where $S = \text{diag}\{f(l)\}_{l=1\ \ldots\ L+1}$ and $$f(l) = 1 - 2 * \text{mod}\left(\frac{Ls(k-1)}{\pi/4}, 2\right) \tag{8}$$

Hence, the received signal vector at the M receive antennas in (5) can be rewritten as $$r(k) = H_1 \cdot s(k) + H_2 \cdot S \cdot s(k-1) + n(k) \tag{9}$$

$$= ([H_1 \vdots 0] + [0 \vdots S \cdot H_2]) \begin{bmatrix} s(k) \\ \vdots \\ s(k-1) \end{bmatrix} + n(k)$$

For the j-th receive antenna, this reduces to $$r_j(k) = \sum_{l=0}^{L+1} \tilde{h}_j(l) s(k-l) + n(k) \tag{10}$$

where $$\tilde{h}_j(l) = \begin{cases} h_{1j}(0) & l = 0 \\ h_{1j}(l) + f(l) \cdot h_{2j}(l-1) & l = 1 \ldots L \\ f(L+1) \cdot h_{2j}(L) & l = L+1 \end{cases} \tag{11}$$

Note that the delay diversity case for 8-PSK with 2 transmit antenna can be obtained by setting $f(l)=1 \forall l$ in equations (9), (10), and (11). Using equation (10), a branch metric for the j-th receive antenna at time k in a reduced-complexity MLSE is $$\xi_j(k) = \left| r(k) - \sum_{l=L_1+1}^{L_1} \tilde{h}_j(l) \tilde{s}(k-l) - \sum_{l=L_1+1}^{L+1} \tilde{h}_j(l) \hat{s}(k-l) \right|^2 \tag{12}$$

where $\tilde{s}(k)$ are the (trial) symbols according to a certain transition and $\hat{s}(k)$ are the previous symbols along the path history. Under some circumstances, a modification of the equation (12) metric may be employed, which provides a delayed decision. The modified metric can be expressed by $$\xi_j(k) = \left| r(k-1) - \sum_{l=0}^{L_1} \tilde{h}_j(l) \tilde{s}(k-l) - \sum_{l=L_1+1}^{L+1} \tilde{h}_j(l) \hat{s}(k-l) \right|^2 \tag{13}$$

The total path metric for the M receive antennas will be $$\xi(k) = \sum_{j=1}^{M} \xi_j(k). \tag{14}$$

In short, equalizer/MSE decoder 23 within receiver 20 needs to obtains an estimate of the transmission channel parameters in a conventional way, e.g., through use of training sequences sent by the transmitter, and proceed to decode received symbols by selecting as the transmitted signal that signal which minimizes the equation (12) metric.

What is claimed is:

1. A method executed in a receiver that combines a decoder with an equalizer in a single module, comprising the steps of:
   said receiver receiving at time k a signal r(k);
   selecting as a signal transmitted by a transmitter a signal that minimizes the following equation metric $$\xi_j(k) = \left| r(k) - \sum_{l=L_1+1}^{L_1} \bar{h}_j(l)\tilde{s}(k-l) - \sum_{l=L_1+1}^{L+1} \tilde{h}_j(l)\hat{s}(k-l) \right|^2$$

where $\bar{h}_j(1)$ is related to both the transmission channel and to the encoding structure in said transmitter, $\tilde{s}(k)$ is a trial symbol specified by a selected trellis transition and $\hat{s}(k)$ is a symbol that was previously decided; and applying said selected signal to said decoder to decode received symbols.

2. The method of claim 1 said signal is selected to improve performance of equalization.

* * * * *

UNITED STATES PATENT AND TRADEMARK OFFICE
CERTIFICATE OF CORRECTION

PATENT NO. : 7,010,029 B1
APPLICATION NO. : 09/687238
DATED : March 7, 2006
INVENTOR(S) : Ayman F. Naguib and Arthur R. Calderbank It is certified that error appears in the above-identified patent and that said Letters Patent is hereby corrected as shown below:

IN THE SPECIFICATION

On the Coversheet, (57) ABSTRACT, the equation in the Abstract

"$$\xi_j(k) = \left| r(k) - \sum_{l=l_1+1}^{L_1} \tilde{h}_j(l)\tilde{s}(k-l) - \sum_{l=l_1+1}^{L-1} \tilde{h}_j(l)\hat{s}(k-l) \right|^2$$"

should read $$\xi_j(k) = \left| r(k) - \sum_{l=0}^{L_1} \tilde{h}_j(l)\tilde{s}(k-l) - \sum_{l=l_1+1}^{L+1} \tilde{h}_j(l)\hat{s}(k-l) \right|^2$$

--

Column 2, line 35, equation

"$$\xi_j(k) = \left| r(k) - \sum_{l=l_1+1}^{L_1} \tilde{h}_j(l)\tilde{s}(k-l) - \sum_{l=l_1+1}^{L-1} \tilde{h}_j(l)\hat{s}(k-l) \right|^2$$"

should read $$\xi_j(k) = \left| r(k) - \sum_{l=0}^{L_1} \tilde{h}_j(l)\tilde{s}(k-l) - \sum_{l=l_1+1}^{L+1} \tilde{h}_j(l)\hat{s}(k-l) \right|^2$$

--

Signed and Sealed this
Eighth Day of May, 2012

David J. Kappos
*Director of the United States Patent and Trademark Office*

Column 6, line 35, equation

"$$\xi_j(k) = \left| r(k) - \sum_{l=L_1+1}^{L_1} \tilde{h}_j(l)\tilde{s}(k-l) - \sum_{l=L_1+1}^{L-1} \tilde{h}_j(l)\hat{s}(k-l) \right|^2$$"

should read

--$$\xi_j(k) = \left| r(k) - \sum_{l=0}^{L_1} \tilde{h}_j(l)\tilde{s}(k-l) - \sum_{l=L_1+1}^{L+1} \tilde{h}_j(l)\hat{s}(k-l) \right|^2$$--

IN THE CLAIMS
Column 7, line 1, equation

"$$\xi_j(k) = \left| r(k) - \sum_{l=L_1+1}^{L_1} \tilde{h}_j(l)\tilde{s}(k-l) - \sum_{l=L_1+1}^{L+1} \tilde{h}_j(l)\hat{s}(k-l) \right|^2$$"

should read

--$$\xi_j(k) = \left| r(k) - \sum_{l=0}^{L_1} \tilde{h}_j(l)\tilde{s}(k-l) - \sum_{l=L_1+1}^{L+1} \tilde{h}_j(l)\hat{s}(k-l) \right|^2$$--